United States Patent

[11] 3,567,884

| [72] | Inventors | Joseph W. Douglas<br>Southfield;<br>Bernard J. Besso, Grosse Pointe, Mich. |
|---|---|---|
| [21] | Appl. No. | 515,882 |
| [22] | Filed | Dec. 23, 1965 |
| [45] | Patented | Mar. 2, 1971 |
| [73] | Assignee | Chrysler Corporation<br>Highland Park, Mich. |

[54] SAFETY SIGNAL FOR BRAKING SYSTEMS
3 Claims, 2 Drawing Figs.

[52] U.S. Cl. ................................................ 200/82, 340/52
[51] Int. Cl. ................................................ H01h 35/38, H01h 35/40
[50] Field of Search ........................................ 340/52 (B), 52 (C), 60, 69; 200/61.44, 81, 82, 83

[56] References Cited
UNITED STATES PATENTS

| 2,176,538 | 10/1939 | Modrack | 200/82 |
| 2,764,176 | 9/1956 | Darquier | 137/118 |
| 3,119,990 | 1/1964 | Wrath | 340/236 |
| 3,309,966 | 3/1967 | Cornilland | 91/391(A) |
| 3,011,595 | 12/1961 | Heiss et al | 340/52X |
| 3,228,194 | 1/1966 | Blair | 340/52UX |

FOREIGN PATENTS

| 204,878 | 7/1956 | Australia. |
| 866,152 | 7/1949 | Germany. |
| 283,964 | 11/1952 | Switzerland. |

*Primary Examiner*—Robert K. Schaefer
*Assistant Examiner*—Robert A. Vanderhye
*Attorney*—Harness and Harris ABSTRACT: A warning apparatus composed of a signal device and a hydraulic differential pressure responsive control for indicating damage or failure of one of the brake circuits in a dual brake system. The control includes a housing having a bore in which is slidably disposed a piston having end portions in sealing engagement with the bore and an intermediate portion of reduced diameter, the piston ends, reduced diameter portion, and the bore forming a chamber which is at atmospheric pressure throughout operation of the brakes. The housing has passageways at both ends of the piston which enable fluid to flow through the housing and contact the outer faces of the piston. A switch connected in circuit to the signal device is mounted on the housing and has a switch actuating portion which extends into the bore between the piston end portions and in engageable relationship therewith when the piston moves in response to a pressure differential acting thereon. Pressure imbalance due to failure of one of the brake circuits causes the piston to contact the switch actuating portion so as to complete the circuit and actuate the signal device.

PATENTED MAR 2 1971
3,567,884
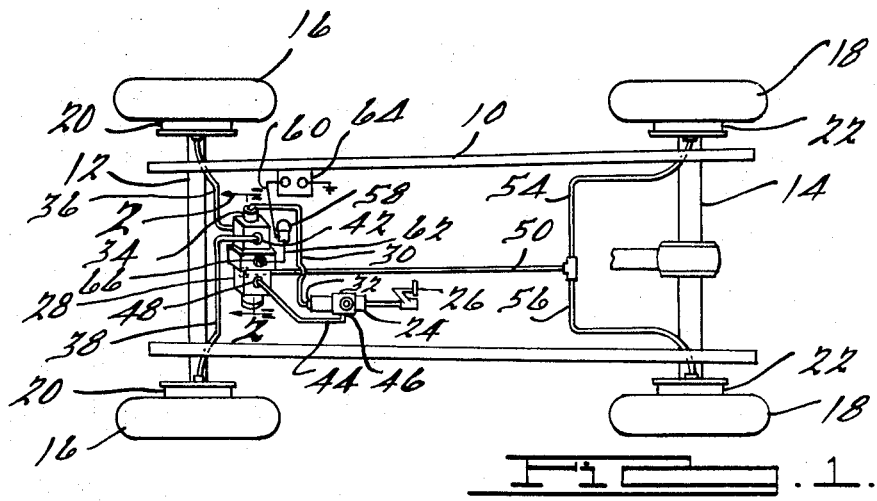
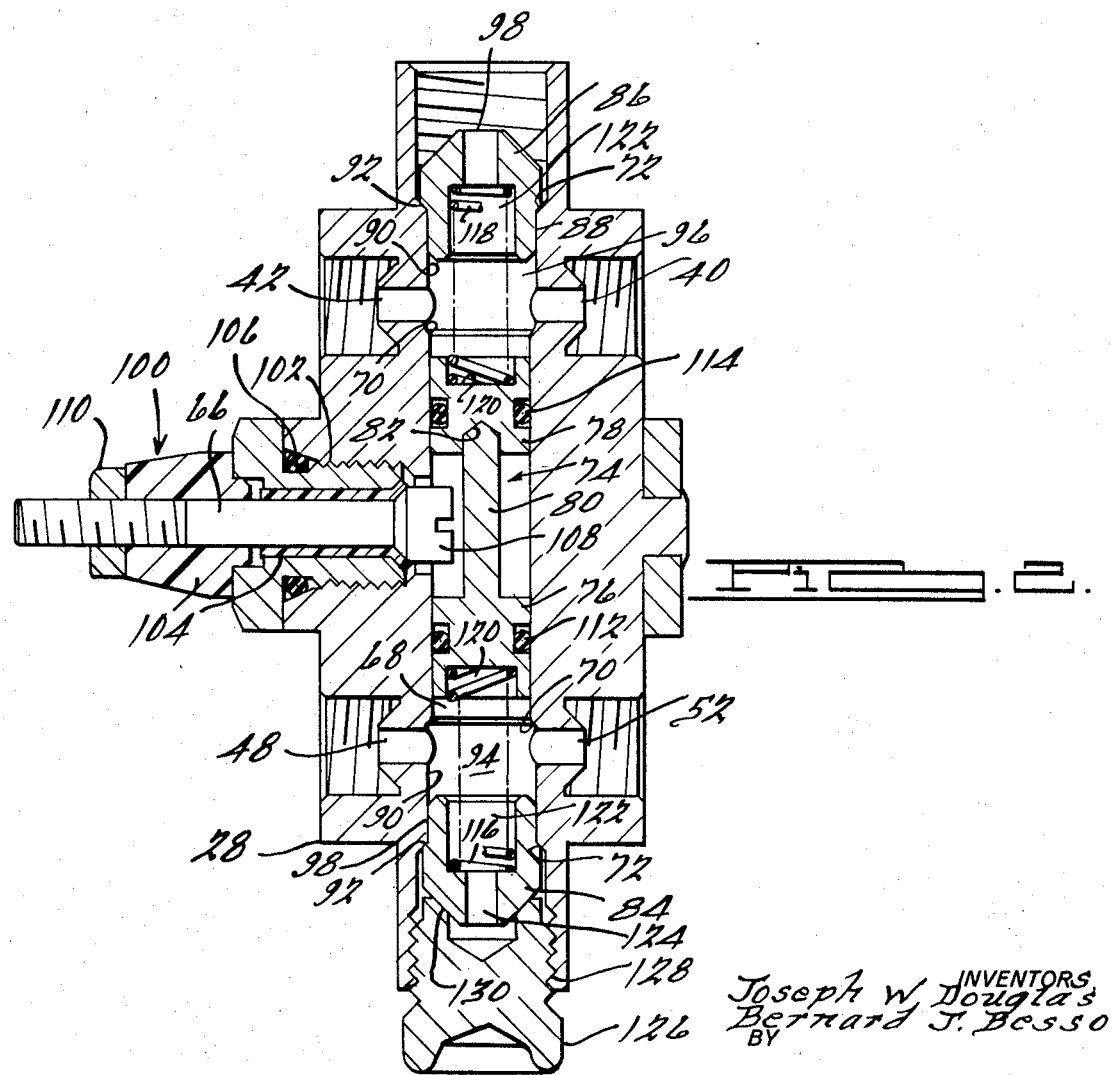
INVENTORS
Joseph W. Douglas
Bernard J. Besso
BY
Harness and Harris
ATTORNEYS.

SAFETY SIGNAL FOR BRAKING SYSTEMS

This invention relates to hydraulically operated brake systems such as are used on automotive vehicles or hydraulic controlled mechanisms generally. More particularly, this invention pertains to a system for detecting and warning the operator of a vehicle of failure or malfunctioning of a portion of the braking system.

Generally, automotive brake systems include a number of brake actuating devices, a fluid displacement mechanism or master cylinder, and a number of brake circuits connecting the displacement mechanism with the brake actuating devices. A serious disadvantage of this type of brake system, however, lies in the fact that a leak or break in one of the brake circuits will allow the fluid in the whole system to drain out thus rendering the entire break system of the vehicle ineffective. In order to overcome complete loss of brakes due to damage of a single portion of the brake system, increasing use is being made of a safety brake system employing a dual master cylinder with twin hydraulic working chambers. One of the working chambers is connected to the front wheel brakes so as to comprise a first brake circuit while the other chamber is connected to the rear wheel brakes thereby providing a second and distinct brake circuit. While the use of such dual brake circuits or branches provides a significant improvement in braking safety it soon became apparent that many vehicle operators did not detect a failure that had occurred in one or the other of the brake circuits. Accordingly, it has been suggested that a signal be built into the braking system to warn the operator in the event of such a failure. A number of hydraulic balanced signal devices have been offered for this purpose; however, they have the attendant disadvantages of being costly or of a construction that is not rugged and durable. For example, one such signal depends upon a pressure differential device in which electrical contacts are subjected to the full pressure carried by the brake circuits during braking and, hence, require an elaborate and costly switch seal construction. Another such warning device employs a diaphragm construction which presents a durability problem since the diaphragms are subjected to pressures in the range of 2,000 pounds per square inch and higher. In addition, the diaphragms need to be exposed to a substantial quantity of brake fluid and, therefore, a considerable amount of brake pedal travel is used in merely supplying brake fluid to the warning device which is a highly undesirable situation. Still another disadvantage found in many of the warning devices presently offered is that it is impossible to bleed or otherwise service the defective hydraulic circuit with the safety system attached. In other cases, it is necessary to completely disassemble the signal device upon its being activated in response to a brake failure in order to reposition its various component parts.

Accordingly, it is an object of this invention to provide a warning signal which is effective to advise the operator of a vehicle which is equipped with separate brake circuits for control of the wheel brake mechanisms that one of the brake circuits has been damaged.

A further object is to provide a warning signal which is actuated by a hydraulic differential pressure control means.

An additional object is to provide a hydraulic differential pressure control means which requires no manual readjustment after responding to a brake circuit failure.

A still further object is to provide a hydraulic differential pressure control means in which an electrical switch is disposed in an arrangement whereby the switch is not subject to the high brake pressure which is present in the brake circuits upon actuation of the master cylinder.

Yet another object of this invention is to provide an improved safety device which is inherently light in weight, which has a minimum number of moving parts and which is of durable but inexpensive construction.

According to the present invention, a safety arrangement for warning of loss of pressure in a brake circuit is provided which is composed of a signal device and a hydraulic differential pressure responsive control for actuating the signal device. The safety arrangement is designed primarily for use in a vehicle having a dual or tandem master cylinder wherein one portion of the master cylinder is connected to and operates the front brake circuit, and another portion of the master cylinder is connected to and operates the rear wheel brake circuit.

The signal device can be a sound warning device, such as a buzzer or automobile horn, or the like, or a visual indicator such as a light bulb, or both. The control apparatus is composed of a housing having a cylinder or bore extending lengthwise thereof and a piston or spool valve positioned in the bore. The control apparatus is mounted between the brake circuits such that one end of the housing is connected to one brake circuit and the other housing end is connected to another circuit. Brake fluid from each of the circuits can pass through the respective end portions of the housing and contact the piston. Since the brake fluid pressure is essentially the same in each circuit the piston is maintained in a relatively centered position. The control apparatus housing carries an electrical contact which in turn is connected to the signal device and the contact is positioned in the bore and between the ends of the piston or spool valve. Normally the electrical contact is not in engagement with the piston. However, if a leak, for example, should occur in one of the brake circuits the pressure differential on the piston will cause the piston to move and engage the electrical contact thereby energizing the signal device.

A further feature of this invention is that resilient means are provided in the housing which act upon the piston so as to keep it centered and out of engagement with the electrical contact. The resilient means exerts a force against the piston which is greater than that resulting from the residual pressure in the brake circuits but less than the hydraulic force which is generated in the circuits when the vehicle brakes are applied by the operator. Accordingly, in the event of a brake circuit leak, the warning device is only actuated when the operator presses upon the brake pedal. This is desirable since experience has shown that if the warning device, as for example, a light, is continuously energized, the operator becomes indifferent to the warning and it thereby loses its effectiveness.

The above and other objects, features and advantages of this invention will be apparent from the following detailed description of a preferred embodiment of the invention and from the accompanying drawings wherein:

FIG. 1 is a plan view of the chassis of an automobile which has the safety device of this invention installed thereon; and FIG. 2 is a cross-sectional view on an enlarged scale of the safety device taken generally on line 2–2 of FIG. 1.

Referring now to FIG. 1 of the drawing, an automobile frame is indicated generally by the numeral 10 and has attached thereto a front axle 12 and a rear axle 14 carrying front and rear wheels 16 and 18, respectively. Attached to the wheels and axles are front brakes 20 and rear brakes 22, each of which comprises a brake actuating device of any suitable type. The brake actuating devices function to brake the wheels when fluid is forced into them, and upon decrease of fluid pressure the devices function to force the fluid back to its source.

A fluid displacement mechanism which is a tandem or dual master cylinder 24 such as is disclosed in U.S. Pat. No. 3,149,468 and which is equipped with a pedal 26 is attached to the vehicle at a suitable place, as is the safety control apparatus of this invention which comprises a housing 28. The dual master cylinder 24 is adapted for supplying hydraulic brake fluid to the front vehicle brakes 20 by a first brake circuit and to the rear vehicle brakes 22 by a second and distinct brake circuit. One end of the safety control housing 28 is interconnected with the first brake circuit which comprises a fluid conduit 30 which is connected between the master cylinder port 32 and an inlet 34 in the safety control housing 28. Fluid conduits 36, 38 of the first circuit extend between outlet ports 40, 42 respectively, of safety control housing 28 and the individual front brakes 20. The other end of the safety control housing 28 is interconnected with the second brake circuit which comprises a conduit 44 connected between master cylinder port 46 and safety control housing inlet port 48, and a conduit 50 which extends from safety control housing outlet port 52 and branches into conduits 54, 56 which lead to the individual rear wheel brakes 22.

A signal device represented by lamp 58 is connected by means of conductors 60, 62 to a source of electrical energy such as battery 64, and an electrical contact terminal 66 which is carried by the control housing 28. The lamp is mounted within sight of the automobile operator and preferably on the instrument panel of the vehicle.

It will be understood that a depression of the pedal 26 causes fluid to be displaced in the master cylinder 24 thus forcing it through each of the master cylinder ports 32, 46, the end portions of control housing 28, and to the front and rear wheel brakes 20 and 22. The master cylinder is provided with valve means (not shown) which in addition to allowing fluid passage in and out of the master cylinder, also, when the brakes are in unapplied condition, maintains a residual pressure in each of the brake circuits of about 10 pounds per square inch.

As shown in FIG. 2, the safety control apparatus of this invention comprises a housing 28 which has a cylinder or bore 68 extending longitudinally therein. The bore 68 extends through the housing 28 and its central region is of smaller diameter than its intermediate end portion, thereby forming outwardly facing ledges 70. Likewise, the intermediate end portions are of smaller diameter than the ends of the bore thereby forming outwardly facing ledges 72. A piston or spool valve 74 is slidably mounted in the bore and has two spaced piston lanes 76 and 78. For ease of assembly, the piston lands are interconnected by means of an arm 80, extending from piston land 76, which has an end portion which is received in recess 82 of piston land 78.

The end portions or bore 68 are provided with insert seals or plugs 84 and 86 which are pressed into the bore so that at least a portion of their outer peripheral surface 88 is in contact with the surface 90 of bore 68. Preferably, the insert seals have a tapered portion 92 which engages the outwardly faced ledges 72 of bore 68 thereby providing additional sealing surface.

Insert seals 84 and 86 and piston lands 76 and 78 cooperate respectively, to define chambers 94 and 96. Communicating with chamber 96 are control housing outlet ports 40 and 42 which in conjunction with chamber 96 comprise a first passageway in an end portion of housing 28. Similarly, control housing inlet port 48 and outlet port 52 communicate with chamber 94 and together thereby comprise a second passageway in the other end portion of housing 28.

As seen with reference to FIGS. 1 and 2, fluid conduits 36 and 38 are screw-threaded into engagement with ports 40 and 42, respectively, while fluid conduit 30 is threadably engaged with insert seal 86 which has been provided with a port 98 which communicates with chamber 96. Similarly, ports 48 and 52 of the opposite end portion of housing 28 are threadably engaged with fluid conduits 44 and 50. Accordingly, brake fluid in the first circuit enters housing 28 from fluid conduit 30, passes through insert seal port 98 and chamber 96, and is discharged from housing 28 via ports 40 and 42. Likewise, the other end portion of housing 28 is interconnected with the fluid conduits 44 and 50 of the second brake circuit so that brake fluid in the second circuit passes through chamber 94.

An electrical switch assembly 100 is threadably received by socket 102 of housing 28 so that the electrode 66 thereof projects into bore 68 and between the piston lands 76, 78. Electrode 66 is isolated from contact with the housing 28 by means of insulator material 104 and O-ring 106. In order to provide ease of assembly, one end of the electrode is provided with a head portion 108 adapted to receive an adjusting tool while its other end is threaded so as to accommodate a nut 110 which secures the component members of the switch assembly.

Piston lands 76 and 78 are provided with O-ring seals 112 and 114, respectively, on their outer peripheral surface which serve to prevent fluid from chambers 94 and 96 from entering the space between the piston lands. Accordingly, the switch assembly 100 is not subjected to the high brake fluid pressure which is generated in the brake circuits during actuation of the vehicle brakes and, hence, an elaborate and costly seal arrangement is not required to prevent loss of brake fluid from the socket 102.

As mentioned earlier, it is desirable if the warning device is actuated only when the operator applies the vehicle brakes. Accordingly, resilient means such as springs 116 and 118 are positioned in the bore 68 such that they exert on each end of the piston 74 a force which is greater than the force exerted against each end of the piston by the hydraulic fluid when under residual pressure. As seen with reference to FIG. 2, each spring has one of its end portions in contact with an insert seal and its opposite end in contact with a piston land. In order to minimize space and bore length requirements, each piston land has a recess 120 formed in its outer face and each insert seal is provided with a recess 122, and the ends of the springs are disposed within the recesses.

As illustrated in FIG. 1, the safety control apparatus is mounted on a forward portion of the vehicle and, therefore, the end portion of housing 28 which is connected to the first brake circuit provides a convenient juncture for branching separate fluid conduits to each of the front wheels. It will be understood of course that the second brake circuit could also be branched within the end portion of housing 28 which is connected with the second circuit. Accordingly, to provide for this type of arrangement and to minimize the number of distinct component parts required for the safety control apparatus, the insert seal 84 is identical to insert seal 86 including the presence of a port 124. Naturally, in the arrangement as shown in FIG. 1, port 124 is not utilized and, therefore, that end portion of the housing is provided with a cap or plug 126 to prevent escape of the hydraulic fluid from the housing via port 124. Cap 126 is threadably engaged with socket 128 of housing 28 and contacts insert seal 84 at 130 thereby providing an effective sealing arrangement.

In normal operation, the master cylinder 24, the first brake circuit comprising conduits 30, 36 and 38 and chamber 96 of housing 28, and the second brake circuit comprising conduits 44, 50, 54 and 56 and chamber 94 of housing 28, are completely filled with fluid which is under a residual pressure of about 10 pounds per square inch. Accordingly, piston 74 is maintained with respect to head portion 108 of electrode 66 in a position shown in FIG. 2. Upon depression of brake pedal 26, the fluid pressure in each of the first and second circuits is built-up to a value of about 2,000 pounds per square inch. Again, piston 74 will not move since the pressure on each of the piston lands 76, 78 is substantially equal.

When through accident, or long use, a brake fluid conduit, for example, conduit 36, is broken or develops a leak, the pressure in the first brake circuit will be substantially less than the pressure in the second brake circuit. Accordingly, upon actuation of the master cylinder, the pressure exerted against piston land 76 will be much greater than the pressure on piston land 78 and when the pressure differential is in the range of about 150 to 200 pounds per square inch, piston 74 will move to the right as seen in FIG. 2 until piston land 76 contacts head portion 108 of electrode 66. Upon such contact, an electrical circuit, as shown in FIG. 1, will be completed thereby energizing signal lamp 58. When the operator releases the pedal 26, the pressure in the second circuit will drop to the normal residual pressure which will again be greater than the first circuit pressure which is exerted against piston land 76. However, piston 74 will return to the position as illustrated in FIG. 1 since the force exerted thereon by spring members 116 and 118 is greater than the residual hydraulic fluid pressure acting on the piston, and signal lamp 58 will be inactivated.

With the operation and construction of the arrangement of this invention in mind, several important features will be recognized. Thus, it will be noted that the control device is inexpensive since the bore and passageways can easily be formed in the housing by a simple machining operation. Likewise, chambers 94 and 96 constitute a part of the first and second brake circuits and, accordingly, brake fluid does not have to be diverted from the circuits in order for it to act on the safety device; therefore, pedal travel is not adversely effected. A further advantage is that an economical and simply constructed switch can easily be mounted on the housing. As mentioned earlier, the switch is not subjected to high brake fluid pressure and therefore costly sealing techniques in the area of the switch assembly are not required. It will also be noted that the head portion 108 of electrode 66 functions as a stop member and thereby limits the movement of piston 74 within bore 68. This is important since the piston lands are positioned relative to the head portion 108 such that when one of the piston lands contacts the electrode, the other piston land is prevented from completely blocking one of the chambers 94, 96. Accordingly, in the event of a slight leak in one of the circuits, at least some brake fluid pressure can be transmitted upon actuation of the master cylinder through the chamber of that circuit thereby keeping the damaged brake circuit at least partially effective. A further feature is found in that since the chambers are of larger diameter than the central region of the bore 68, the O-ring seals 112, 114 carried by the piston are not subject to damage by sharp edges or burrs which may arise upon forming the ports which communicate with the chambers. Therefore, the O-ring seals will remain serviceable when the piston is returned by the spring 116, 118 to a position as shown in FIG. 2. Furthermore, since the piston is maintained in the central region of the bore by the springs 116, 118, the chamber which is interconnected with the defective brake circuit is unobstructed when the master cylinder is not actuated and the damaged brake circuit can therefore be repaired and refilled with fluid without a need for disassembling the safety control. Likewise, since each of springs 116, 118 exert a force on the piston which is greater than the force due to the residual hydraulic pressure acting thereon, the piston will automatically return to its normal centered position. Accordingly, the safety control upon being actuated in response to a brake circuit failure does not need to be disassembled and the components thereof repositioned in order to render the safety control operational for future service.

From the foregoing description it is apparent that the objects of this invention have been obtained, and it will be understood that modifications and variations may be effected without departing from the scope of the novel concepts of the present invention as defined in the appended claims.

We claim:

1. In an automotive vehicle equipped with a front and rear set of brakes and a safety hydraulic brake control system wherein a master cylinder is connected to the front set of brakes by a first brake circuit and to the rear set of brakes by a second brake circuit, a signal means operable for warning of loss of pressure in one of said first and second brake circuits and hydraulic differential pressure responsive control means communicating with said first and second brake circuits which is effective at times to actuate said signal means, said control means comprising a housing having a bore extending longitudinally therein, a piston having spaced piston lands and a portion of reduced diameter between said lands movably disposed in said bore, said reduced diameter portion and inner faces of said lands cooperating with said bore to define a chamber which is at atmospheric pressure throughout operation of the vehicle brakes, a first passageway formed in one end portion of said housing and connected to said first circuit so as to enable hydraulic fluid to flow through said housing and contact the outer face of one of said piston lands, a second passageway formed in the other end portion of said housing and connected to said second brake circuit so as to enable hydraulic fluid to flow through said housing and contact the outer face of the other of said piston lands, sealing means curved by each of said piston lands and engaging the bore, said sealing means permitting hydraulic fluid to contact the outer faces of said lands and preventing hydraulic fluid from building pressure within said chamber, and a switch carried by said housing and having a portion extending into said chamber and positioned between said spaced piston lands so as to be operable by movement of said piston to complete a signal actuating circuit.

2. In an automotive vehicle equipped with a front and rear set of brakes and a safety hydraulic brake control system wherein a master cylinder is connected to the front set of brakes by a first brake circuit and to the rear set of brakes by a second brake circuit, a signal means operable for warning of loss of pressure in one of said first and second brake circuits and hydraulic differential pressure responsive control means communicating with said first and second brake circuits which is effective at times to actuate said signal means, said control means comprising a housing having a bore extending longitudinally therein, a piston having spaced piston lands and a portion of reduced diameter between said lands movable disposed in said bore, said reduced diameter portion and inner faces of said lands cooperating with said bore to define a chamber which is at atmospheric pressure throughout operation of the vehicle brakes, an insert seal in each end portion of said bore, said insert seals and said spaced piston lands cooperating to form first and second fluid cavities adjacent the opposite end portions of said bore, a first passageway formed in one end portion of said housing and connected to said first circuit so as to enable hydraulic fluid to flow through said first cavity and exert pressure on one of said piston lands, a second passageway formed in the other end portion of said housing and connected to said second brake circuit so as to enable hydraulic fluid to flow through said second cavity and exert pressure on the other of said piston lands, sealing means carried by each of said piston lands and engaging the bore, said sealing means permitting hydraulic fluid to contact the outer faces of said lands and preventing hydraulic fluid from building pressure within said chamber, and a switch connected to said signal means which is operable by said piston, said switch portion extending into said chamber and positioned between said spaced piston lands so as to be in engageable relationship with one of said piston lands upon movement of said piston.

3. A control means as set forth in claim 13 wherein each of said insert seals is a generally cylindrical member having at least a portion of its peripheral surface in sealing engagement with the surface of said bore and wherein at least one of said insert seals has an axially extending conduit formed therethrough, said conduit having one end in communication with one of said cavities and its opposite end in communication with a cooperating brake circuit.